(12) United States Patent
Kulkarni et al.

(10) Patent No.: US 10,127,651 B2
(45) Date of Patent: Nov. 13, 2018

(54) DEFECT SENSITIVITY OF SEMICONDUCTOR WAFER INSPECTORS USING DESIGN DATA WITH WAFER IMAGE DATA

(71) Applicant: KLA-Tencor Corporation, Milpitas, CA (US)

(72) Inventors: Ashok Kulkarni, San Jose, CA (US);
Saibal Banerjee, Fremont, CA (US);
Santosh Bhattacharyya, San Jose, CA (US); Bjorn Brauer, Beaverton, OR (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/356,729

(22) Filed: Nov. 21, 2016

(65) Prior Publication Data
US 2017/0206650 A1   Jul. 20, 2017

Related U.S. Application Data

(60) Provisional application No. 62/279,483, filed on Jan. 15, 2016.

(51) Int. Cl.
*G06K 9/00*     (2006.01)
*G06T 7/00*     (2017.01)

(52) U.S. Cl.
CPC .......... *G06T 7/0006* (2013.01); *G06T 7/0026* (2013.01); *G06T 2207/10061* (2013.01); *G06T 2207/30148* (2013.01)

(58) Field of Classification Search
CPC ..... G06T 7/0006; G06T 7/0026; G06T 7/001; G06T 7/0004; G06T 2207/30148; G06T 2207/10061
See application file for complete search history.

(56) References Cited

U.S. PATENT DOCUMENTS

| | | | | |
|---|---|---|---|---|
| 6,324,298 | B1 * | 11/2001 | O'Dell et al. | G01N 21/9501 257/E21.53 |
| 7,831,083 | B1 * | 11/2010 | Lauber | G01N 21/9501 382/141 |
| 7,877,722 | B2 | 1/2011 | Duffy et al. | |
| 9,098,891 | B2 | 8/2015 | Kulkarni et al. | |
| 2002/0114506 | A1 * | 8/2002 | Hiroi | G01N 21/95684 382/149 |
| 2004/0156539 | A1 * | 8/2004 | Jansson | G01N 21/8903 382/145 |
| 2005/0033538 | A1 | 2/2005 | Okabe et al. | |
| 2005/0043903 | A1 * | 2/2005 | Nara | G06T 7/001 702/35 |
| 2007/0288219 | A1 | 12/2007 | Zafar et al. | |

(Continued)

OTHER PUBLICATIONS

ISA/KR, International Search Report for PCT/US2017/013362, dated Apr. 21, 2017.

*Primary Examiner* — Amir Alavi
(74) *Attorney, Agent, or Firm* — Hodgson Russ LLP (57) ABSTRACT

Criticality of a detected defect can be determined based on context codes. The context codes can be generated for a region, each of which may be part of a die. Noise levels can be used to group context codes. The context codes can be used to automatically classify a range of design contexts present on a die without needing certain information a priori.

20 Claims, 5 Drawing Sheets

(56) References Cited

U.S. PATENT DOCUMENTS

| | | | |
|---|---|---|---|
| 2010/0188499 A1* | 7/2010 | Amanullah | G01N 21/8806 |
| | | | 348/87 |
| 2012/0155740 A1 | 6/2012 | Cho et al. | |
| 2013/0202187 A1* | 8/2013 | Goren | G01N 21/9501 |
| | | | 382/149 |
| 2014/0193065 A1 | 7/2014 | Chu et al. | |
| 2015/0192438 A1* | 7/2015 | Choi | G06F 1/1626 |
| | | | 73/431 |
| 2015/0357216 A1* | 12/2015 | Chen | H01L 21/67271 |
| | | | 209/577 |
| 2017/0186151 A1 | 6/2017 | Banerjee et al. | |
| 2017/0206650 A1* | 7/2017 | Kulkarni | G06T 7/0006 |
| 2018/0033132 A1* | 2/2018 | Zafar | G06T 7/001 |

\* cited by examiner

DEFECT SENSITIVITY OF SEMICONDUCTOR WAFER INSPECTORS USING DESIGN DATA WITH WAFER IMAGE DATA

CROSS-REFERENCE TO RELATED APPLICATIONS

This application claims priority to the provisional patent application filed Jan. 15, 2016 and assigned U.S. App. No. 62/279,483, the disclosure of which is hereby incorporated by reference.

FIELD OF THE DISCLOSURE

This disclosure relates to defect detection.

BACKGROUND OF THE DISCLOSURE

Wafer inspection systems help a semiconductor manufacturer increase and maintain integrated circuit (IC) chip yields by detecting defects that occur during the manufacturing process. One purpose of inspection systems is to monitor whether a manufacturing process meets specifications. The inspection system indicates the problem and/or the source of the problem if the manufacturing process is outside the scope of established norms, which the semiconductor manufacturer can then address.

Evolution of the semiconductor manufacturing industry is placing ever greater demands on yield management and, in particular, on metrology and inspection systems. Critical dimensions are shrinking while wafer size is increasing. Economics is driving the industry to decrease the time for achieving high-yield, high-value production. Thus, minimizing the total time from detecting a yield problem to fixing it determines the return-on-investment for the semiconductor manufacturer.

Defect detection on semiconductor wafers can be complicated and time-consuming. Semiconductor manufacturers need improved techniques to detect defects in a faster and more reliable manner.

In a first technique, design rule based scripting language was used to define inspection regions that satisfy the rules, group such regions into sensitivity regions, analyze noise characteristics of each such region during inspection recipe setup, and tune sensitivity thresholds per sensitivity region. Not all critical regions are known a priori by a semiconductor manufacturer, which is a drawback of the first technique. With each design node and process change, the types of critical regions can vary. It is only through inspection and review that such new regions are discovered. It also is not easy to infer which rules best describe these newly discovered regions. Design rule based scripting language relies on general rules (e.g., described using a scripting language such as Standard Verification Rule Format (SVRF)) to generate inspection regions. Regarding noise estimation, design rule based scripting language may measure noise of each region, but this noise covers a large variety of contexts and is equivalent to mixing populations which have distinct and different noise characteristics.

In a second technique, design clips of patterns of interest (POI) or "hot spots" are provided. A design database is searched (e.g., using a pattern search tool) for all locations of these patterns in the die and then the regions are inspected using a sensitive threshold. The second technique suffers from the same drawbacks as the first technique. Not all POI are discovered easily, even with experiments using process window qualification (PWQ) wafers. The POI known to the user may only cover part of the total set of "weak" patterns. The total coverage of hot spot care areas is generally low (e.g., in the 1% range), even when there are millions of them. In this example, a care area (CA) group can include a set of rectangles (or polygons) on the surface of a die that can be combined. If the number hot spot care area groups are increased to several thousand to have a better coverage, every CA group would need to be tuned independently, which is not practical. One particular risk of hot spot care areas is that there are areas which are not covered by them, which might result in missing defects and excursions because the sensitivity in the areas not covered by hot spots is too insensitive. Moreover, the current methods make no use of the wafer image information for determining how such critical regions should be grouped together for purposes of finding outliers (e.g., potential defects). Without performing some grouping of such regions, there may not be sufficient pixels in order to robustly determine which pixels are potential defects.

In a third technique, a "hot" inspection of the wafer is run. A hot inspection is one where the detection threshold (e.g., the minimum difference in die-to-die gray level) to determine whether a pixel is defective or not is set to a low value. Hence, such a detection recipe would find a large number of "defects." One can the tune the threshold to catch only the real defects and filter out false detections such as noise or nuisance defects. Resulting defect locations are grouped using design-based grouping (DBG). Groups that contain defects of interest versus nuisance defects are determined, then all locations where such patterns of interest exist on the die are found (e.g., using a pattern search tool) and inspection sensitivity regions are created at these locations for subsequent inspection recipes. This third technique relies on a uniformly hot inspection to discover weak areas. Unfortunately, the resulting number of DBG bins can be excessive and sampling each bin sufficiently may be too cumbersome in terms of review time on a scanning electron microscope (SEM) review tool. Discarding DBG bins containing too few defects from review may result in missing a critical defect type. Also, such a review sampling strategy often ends up reviewing an excessive number of nuisance defects, such as those caused by color changes across dies due to film thickness variations, edge roughness, or other features. This large number of nuisance defects can result in the sample set missing critical defects present in those bins. DBG does not combine structures which have the same noise values, which generates a large number of groups (bins) that cannot be handled by a user to separately tune them. The noise floor calculation is not done for all the structures within one die and group, which can make it unstable due to limited statistics. It also does not consider the noisiness of a certain structure.

Therefore, what is needed is improved defect sensitivity during wafer inspection using design data in combination with wafer image data.

BRIEF SUMMARY OF THE DISCLOSURE

In a first embodiment, a system is provided. The system comprises a review tool and a controller in electronic communication with the review tool. The review tool includes a stage configured to hold a wafer and an image generation system configured to generate an image of the wafer. The controller is configured to: separate a design file into a plurality of regions; generate a context code for each of the regions; align an image of the die of the wafer to the design file at the die; group the context codes into one or more inspection sensitivity regions based on a noise level of each of the regions; scan the die using the inspection sensitivity regions; calculate a threshold for each of the inspection sensitivity regions; examine the context code for pixels at a detected defect; and determine a criticality of the detected defect based on one or more of the context codes. The design file is of a die of the wafer. The context code is configured to encode geometry of one of the regions. The controller can include a processor, an electronic data storage unit in electronic communication with the processor, and a communication port in electronic communication with the processor and the electronic data storage unit. The electronic data storage unit may include the design file.

The image generation system can be configured to use at least one of an electron beam, a broad band plasma, or a laser to generate the image of the wafer. In an instance, the review tool is a scanning electron microscope.

The context code can represent one or more of edge density, a vector of feature values, or a set of shape primitives of one of the regions.

The controller can be further configured to analyze noise of the regions prior to grouping the context codes.

The controller can be further configured to bin local geometry to capture at least one of line and space density measurement, line and space orientations, high curvature points, and line ends and object junctions.

In a second embodiment, a method is provided. The method comprises: separating, using a controller, a design file into a plurality of regions; generating, using the controller, a context code for each of the regions; aligning, using the controller, an image of the die to the design file at the die; grouping, using the controller, the context code into one or more inspection sensitivity regions based on a noise level of each of the regions; scanning the die using the inspection sensitivity regions; calculating, using the controller, a threshold for each of the inspection sensitivity regions; examining, using the controller, the context code for pixels at a detected defect; and determining, using the controller, a criticality of the detected defect based on one or more of the context codes. The design file is of a die of a wafer. The context code is configured to encode geometry of one of the regions.

The context code can represent one or more of edge density, a vector of feature values, or a set of shape primitives of one of the regions.

The method can further comprise analyzing, using the processor, noise of the regions prior to the grouping.

The image of the die may be a scanning electron microscope image.

The design file can include a plurality of layers disposed on one another.

The context code can be configured to be a measure of edge density or a vector of feature values computed from the design file.

The context code can be configured to be an encoding of a set of shape primitives in the region. The encoding may be frequency based and may be configured to count existence of shape primitives in the region. The encoding also may be of a spatial relationship between the shape primitives.

The method can further comprise binning local geometry. The binning can capture at least one of line and space density measurement, line and space orientations, high curvature points, and line ends and object junctions.

The design file may be generated from a wafer image.

In a third embodiment, a non-transitory computer-readable storage medium, comprising one or more programs for executing the steps on one or more computing devices is provided. The steps include: separating a design file of a die of a wafer into a plurality of regions; generating a context code for each of the regions; aligning an image of the die to the design file at the die; grouping the context code into one or more inspection sensitivity regions based on a noise level of each of the regions; scanning the die using the inspection sensitivity regions; calculating a threshold for each of the inspection sensitivity regions; examining the context code for pixels at a detected defect; and determining a criticality of the detected defect based on one or more of the context codes. The context code is configured to encode geometry of one of the regions.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Disclosed are techniques that automatically classify a range of design contexts present on a die without needing a priori information, such as one or more patterns of interest (POIs). POI are a known specific geometrical arrangement of polygons with fixed known dimensions that are known to fail. Since the techniques disclosed herein can search for all geometrical arrangements by analyzing the design at high resolution and then assign a criticality measure to each such distinct arrangement, the user may not need to supply this information. If the user does define POIs, these POIs and other locations similar but not exactly matching the POIs can be captured. This allows a user to discover more potential hot spots or design weaknesses. Inspection tool sensitivity can be improved through the embodiments disclosed herein. The full die can be analyzed for context, so there may be no scope for missing critical regions. The granularity of the context map can be down to the inspection pixel size, which can provide pin-point segmentation of the whole die. Maximum sensitivity for a region based on the noise characteristics of the region can be performed by tuning. Upon defect detection, the design context in which the defect occurs and its surrounding context can be available for binning and determining defect criticality for review purposes.

The techniques disclosed herein can automatically analyze the design context at a sub-micron level (e.g., down to a few nanometers or even an Angstrom) and can automatically partition these distinct contexts into different regions. Criticality or a complexity measure can be assigned to each such context. Noise per context can be measured automatically and, in an instance, contexts may be combined only if their noise behavior is similar and criticality is similar. In this way, techniques disclosed herein are able to achieve better sensitivity by using both high resolution context and a judicious grouping of contexts that are similar in noise and criticality.

Figure 1:
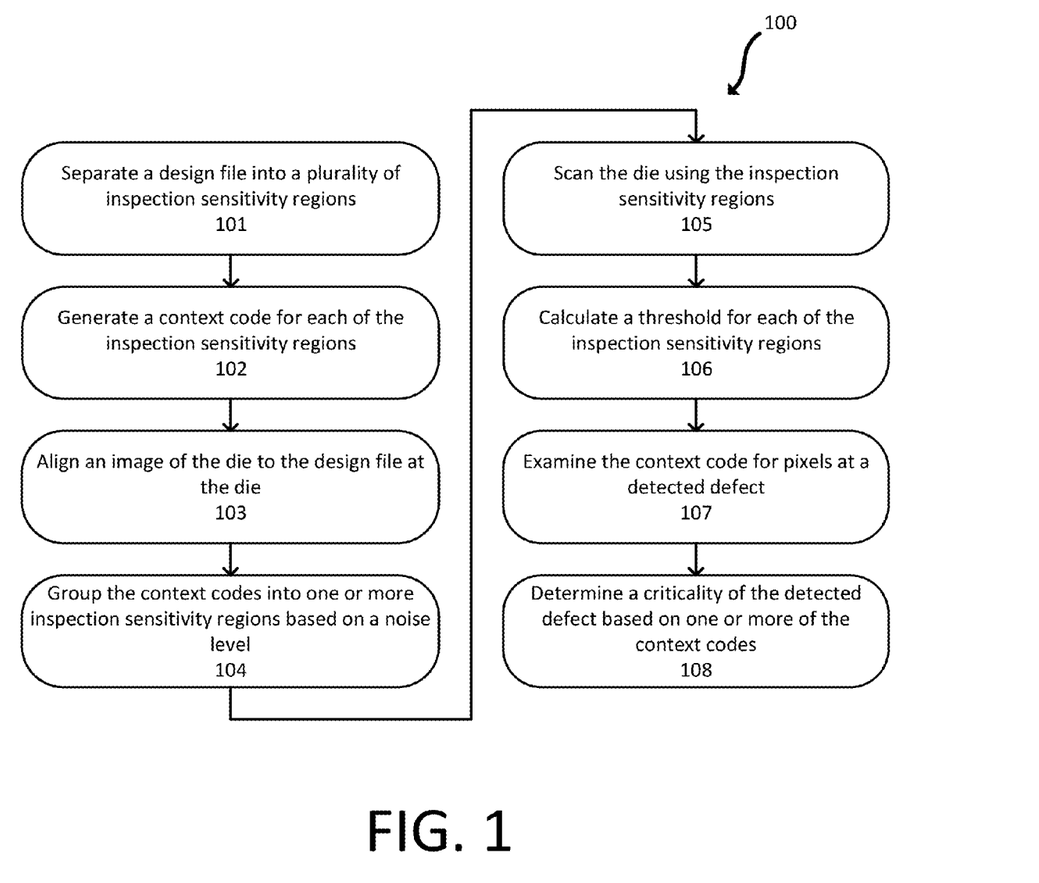
FIG. 1 is a flowchart of an embodiment in accordance with the present disclosure.

In the method 100 of FIG. 1, a design file is separated 101 into a plurality of regions. The design file may be or may include a die of a wafer. When broken up (at some level of granularity), the regions can be as small as the size of an individual pixel of the inspection system or as large as a whole frame (e.g., 1024×1024 pixels). A frame may be a typical image size that an inspection system's image processing algorithms operate on. One or more regions can include a whole die. Less than an entire die also can be used in the method 100. For example, a user can draw a region of a die to be analyzed using an electronic design automation (EDA) tool or suitable graphical user interface (GUI). In another example, a user can request an entire die be analyzed. Certain parts of a design may be skipped based on the particular layout (e.g., areas with "dummy fill"). In an instance, a user may only want to analyze random logic portions of the design, which excludes memory sections.

The design can include a layout of the top layer (which will be inspected), but also can include the design layout of the previous layers and even future layers that will be subsequently patterned. In some cases, a defect at a current layer may be more critical than another depending upon the subsequent patterning step. In a similar fashion, the previous layer can be of importance to a defect in a current layer. For example, a previous layer contact/via near the end of a current layer line may be important to distinguish from other line ends where no previous layer contact/via is present. Also, since previous layer geometry affects the noise characteristics of the current layer, it may be useful to have that information for defect detection.

User-supplied design regions of interest, such as patterns of interest (POI), the results of running a set of rule-based searches on the design, or areas determined to be of special significance using other analysis methods such as process modeling, electrical net list analysis, yield analysis, or destructive testing of the die, also can be imported into the system before or during the separation 101.

A context code is generated 102 for each of the regions (e.g., segment) of the die. The context code is configured to encode geometry of one of the regions. For example, the design in each region is analyzed to generate a context code. This context code can be any encoding of the geometry contained in the region. The design analysis can work on the vector description of the geometry in the region or a pixelated part (e.g., a rendered image) of the design. The encoding, for example, can be a measure of edge density, a vector of feature values computed from the design, or an encoding of a set of shape primitives (e.g., lines, corners, etc.) in the region. The encoding also can be the result of a frequency-based approach to analysis that counts existence of certain shape primitives in the region and then encodes the presence/absence of these shape primitives. Alternatively, it can encode a particular spatial relationships between the shape primitives that are in close proximity. For example, use of shape primitives is disclosed in U.S. application Ser. No. 15/355,606, which is incorporated by reference in its entirety.

Figure 3:
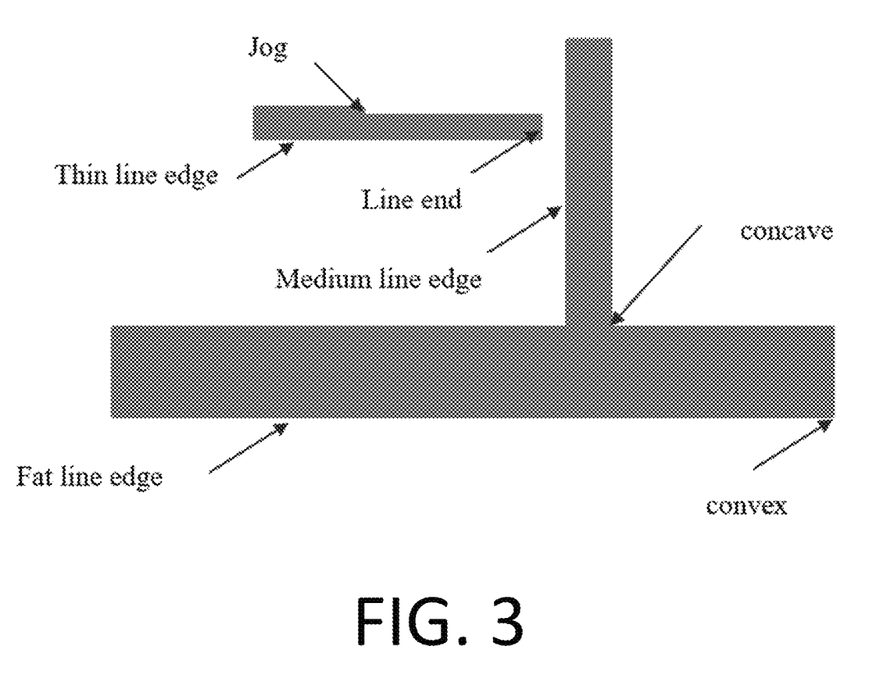
FIG. 3 is an example of pixel-level geometrical binning encoding.

An example of context coding is shown in FIG. 3, which is an example of pixel-level geometrical binning encoding. Each pixel (or each pixel within a grid applied to the shapes of FIG. 3) can contain a code that specifies, for example, whether a thin line, medium line, or fat line edge goes through or whether a line end, convex or concave corner, or a jog is present in it.

The encoding also can be learned using a deep learning machine, such as using an auto encoder/stacked encoder approach, that is fed the entire set of design segments/regions and automatically encodes the clusters of clips in an unsupervised fashion or otherwise without user input. Semi-supervised clustering approaches also may be used.

Any technique disclosed herein or a combination of any of the techniques disclosed herein may be used to encode the context code in each region of the die. The output of the encoding is a context map at some spatial resolution that covers the entire die or one or more portions of the die if the remaining regions are considered to be not worth inspecting.

Turning back to FIG. 1, an image of the die is aligned 103 to the design file at the die. Whole die images may be obtained using an inspection system that inspects a wafer. The images from the inspection system can be aligned to the design. The number of images gathered may be such that a stable estimate of the noise that may be encountered during production of the wafer can be obtained. Noise data from multiple frames of a die and multiple dies (e.g., dies at different locations on the wafer) may provide a reliable estimate of the noise, though other techniques to provide a reliable estimate of the noise are possible.

Noise of similar or identical regions may be analyzed before, during or after the aligning 103. For example, this can be as measured by die-to-die image comparisons or within die comparisons.

The context codes are grouped 104 into one or more inspection sensitivity regions based on a noise level of each of the regions. Similar noise characteristics can be grouped together. For example, heuristics can be used to group a context with, for example, similar criticality. There may be too many distinct contexts without grouping 104, which can make it difficult to fine-tune a threshold for each context independently. Some contexts may be sparse, such as having too few pixels in the region/segment, for outlier detection that relies on a statistically significant data points to flag outlier pixels. Criticality of contexts may need to be considered when grouping by noise characteristics. Keeping critical contexts and non-critical or less critical contexts distinct may be beneficial because the less critical contexts can be de-sensitized without compromising sensitivity in critical areas.

Each context or inspection sensitivity region can be tuned to provide a maximum sensitivity for that inspection sensitivity region based on the noise characteristics of the inspection sensitivity region. Sensitivity regions can be tuned by adjusting a threshold and obtaining an estimate of real defects detected versus nuisance defects. This can be used to establish an appropriate operating point.

The die or dies are scanned 105 using the inspection sensitivity regions. This can include scanning an entire wafer or just a subset of dies. Scanning 105 can also be combined with grouping 104. Various techniques can be used to scan the dies. For example, a wafer inspection system can be programmed to scan any subset of die on a wafer. This can be referred to as a die sample plan. The wafer inspection system can scan the wafer in a serpentine fashion, one swath at a time, until the selected dies are covered.

A threshold is calculated 106 for each of the inspection sensitivity regions. Appropriate thresholds/offsets may be determined for each inspection sensitivity region. Criticality can be used to determine the threshold, which allows more critical regions to be inspected with more sensitive thresholds.

The context code is examined 107 for pixels at a detected defect. For example, a defect blob can cover more than one pixel and, hence, more than one code. A union of codes or the most critical code can be used to describe the defect.

A criticality of the detected defect is determined 108 based on one or more of the context codes. The design context of a detected defect may be determined by examining the context code for the pixels where the defect is located. This information along with the design context of its surrounding region can be used to determine the criticality of the defect. For example, it can be determined that the defect is close to an edge, bridging a narrow space, at a line end, or elsewhere that may be critical. Because of its impact to defect criticality, this information may be useful for review sample generation and/or to estimate yield.

The criticality at a location can be any function of the primitives that exist around some region surrounding the location and/or a count of the primitives in that region or a measure of the number of "opposing primitives" where "opposing" could mean primitives in certain orientations with respect to each other. An example is opposing corners or a horizontal line next to a perpendicular line. The criticality could also be a user-defined preference score to detect or sample a defect in a particular geometry. Criticality is a measure of the likelihood of a defect occurring at that location. The likelihood can be estimated from a statistical analysis of past defects detected or can be generated by physical modeling of the defect mechanism or by inspecting a PWQ wafer where focus and exposure are intentionally modulated on a per die basis and the wafer is then scanned by an inspector to determine the perturbation in focus/exposure required to cause a particular geometry to fail. In an instance, the criticality value of a location where defects are unlikely to occur is zero. This may be a location that has no user interest even if it has a bona fide defect on it. Thus, defects detected at zero or low criticality locations can be treated as nuisances.

Figure 2:
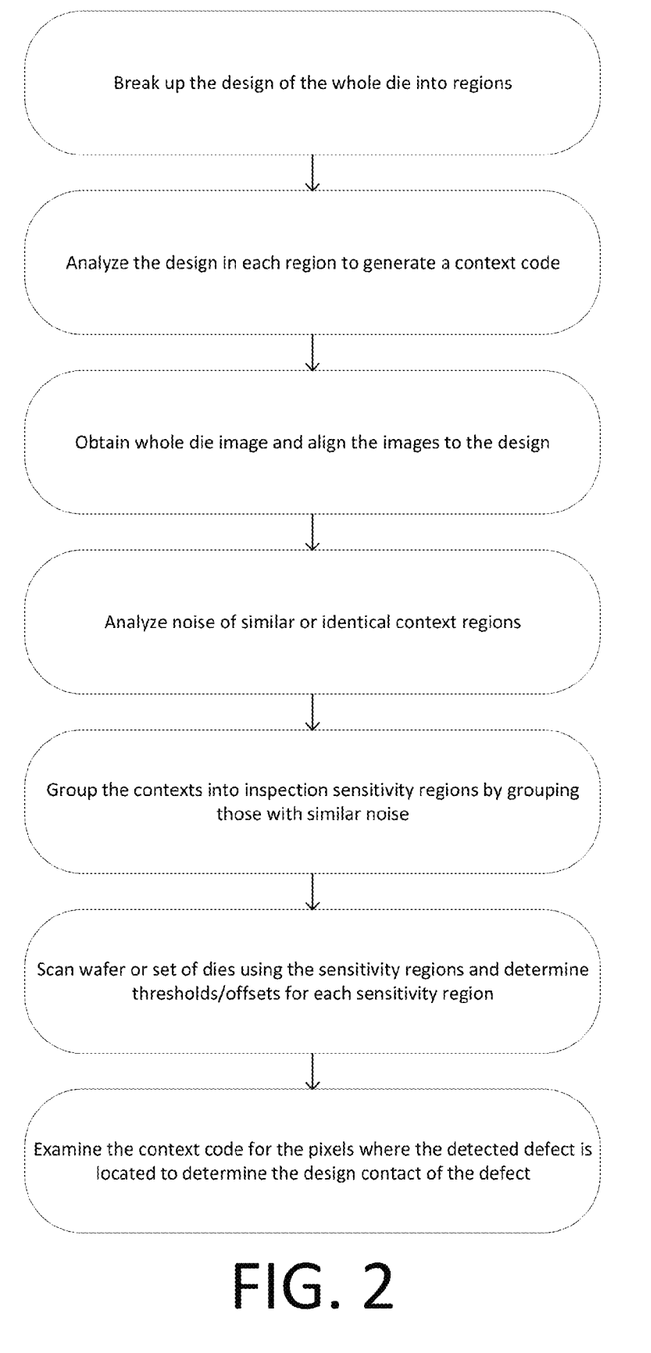
FIG. 2 is a flowchart of another embodiment in accordance with the present disclosure.

FIG. 2 is a flowchart of another embodiment in accordance with the present disclosure.

If the design is not available, a whole die scan with a high resolution tool such as an SEM can be processed using image processing tool in order to create a "design proxy" image, or an idealized rendering of the image. Thus, a wafer image can be used to generate a design file. This image can then be analyzed using the same techniques described above to generate a context map at the desired spatial granularity.

Alternatively, if the image of the reticle/mask used for patterning the layer is available, this image can be scanned and used as a design proxy for creating the context map.

Figure 4:
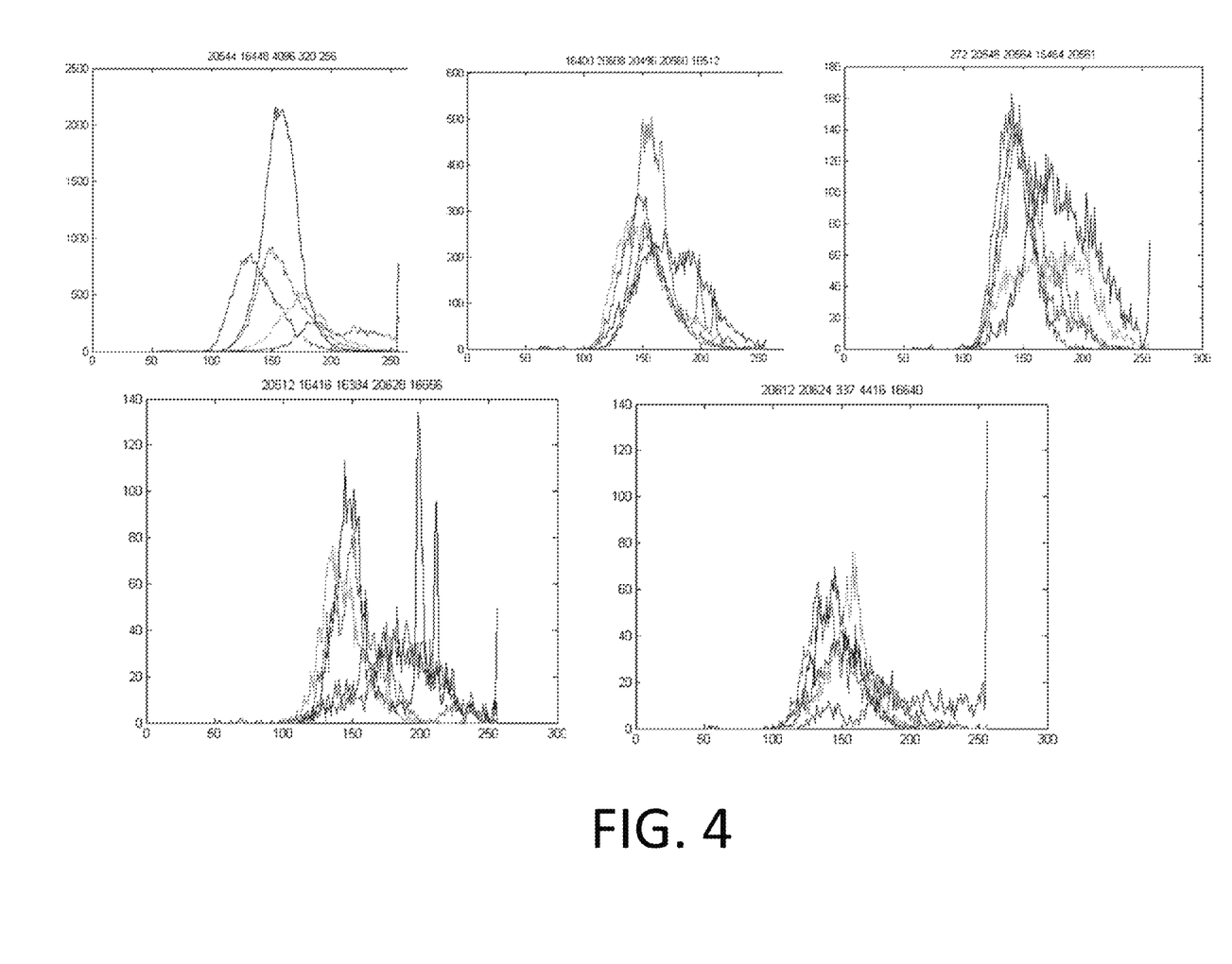
FIG. 4 are graphs showing pixel-level geometrical binning noise characteristics.

Since only a single or a small number of contexts with similar noise characteristics may be grouped together, there may be less chance of noisy pixels from another context polluting (e.g., de-sensitizing) the threshold of this context/group of contexts using the embodiments disclosed herein. For example, FIG. 4 includes a collection of twenty-five noise histograms showing pixel-level geometrical binning noise characteristics. Each histogram shows the count of pixels (y axis) versus the die-to-die difference gray level (x-axis), which is a measure of noise. The most populous twenty-five contexts have been plotted. The graphs are split into five groups, with the five most populous being plotted in the first (top-left) graph, the next five in the second graph, etc. The numbers above the graph are bit encoding of the five contexts. The graphs show that different contexts have a different spread of noise levels.

A particular algorithm or criticality determination may only use the minimum number of pixels, such as a thousand pixels, ten thousand pixels, or other values. The minimum pixel number can be determined by a user or an algorithm. This can increase throughput.

A priori known critical contexts can be kept separate from other contexts. For example, a priori known non-critical contexts can be kept in a low sensitivity region/regions. In the case of using a priori information, a user can specify the critical and non-critical regions. In the absence of such information, the results of a hot scan or prior defects on similar layers can be used to infer a criticality measure and can be computed using any of the methods disclosed herein.

Since design contexts are the "alphabets" of the design, another device layout may have similar contexts. Another device layout also may have some new contexts not found on the first device. Thus, a library of design contexts can be constructed and noise characteristics of each can be recorded. This library can be expanded as new contexts are discovered. This library may then be used to create an inspection recipe for another device (e.g., for the same layer) assuming that similar contexts will have similar noise characteristics across devices. During recipe setup, this assumption can be checked by doing a per-context noise analysis on the new device and comparing it with the library values. The library can help reduce the load on inspection threshold tuning for many contexts on subsequent devices for that layer inspection step, such as disclosed in U.S. Pat. No. 7,877,722, which is incorporated by reference in its entirety.

In pixel-level geometrical binning (PGB), each optical pixel is described by the geometry it covers. Geometry can be obtained from a design or from an SEM image during review. For design-derived PGB, previous layer geometry also can be used. Geometry can be defined in terms of shape primitives. For example, thin lines, thin spaces, thin line ends, thin space ends, junctions, points of high curvature, fat object edges, small objects, or other shape primitives can be used. Orientation information for each shape primitive also can be computed. Geometry feature counts within an optical pixel can be used to define bins. Bin definitions can be automatic. The bin to which each optical pixel belongs can be computed as soon as the design grid is aligned with the image pixel grid.

PGB can be used to capture all of the following properties of the local geometry: line and space density measures (defect size criticality); line and space orientations (interaction with optical modes); high curvature points (process variation); and/or line ends and object junctions (process variation). Bins can be ranked for criticality (of defects occurring in them) and bins can be characterized for their noise signatures (useful for filtering out noise events). Bins can be based on, for example, criticality.

PGB differs from design-based binning (DBB) in at least the following ways. DBB uses prototypes (geometries) to define bins while PGB uses properties of geometries to define bins. PGB can require little to no user training. DBB does not explicitly use orientation or shape information while PGB does. DBB requires an exact match of geometries. PGB bins may contain similar but not identical geometries. A PGB bin is more "descriptive," such as being defined by the existence of or counts of shape primitives. A DBB bin is defined by example. DBG and PGB can be combined to find systematic and critical random defects.

PGB is multi-dimensional, unlike a defect criticality index (DCI) or a process criticality index (PCI). For example, PGB can incorporate information about multiple geometry types. DCI and PCI are single dimensional features. Events in a PGB bin can be ranked by DCI measure.

Figure 5:
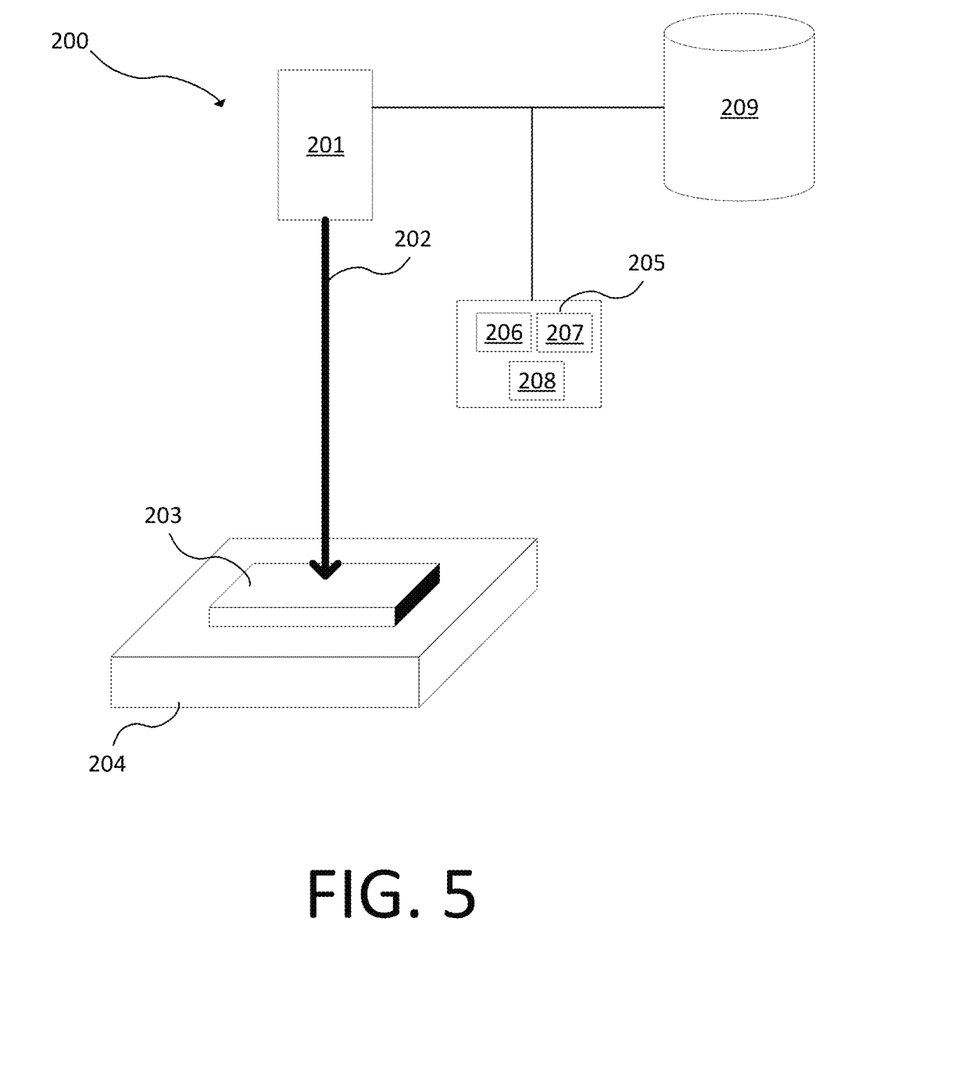
FIG. 5 is an embodiment of a system in accordance with the present disclosure.

FIG. 5 is a block diagram of a system in accordance with the present disclosure. A controller 205 is in electronic communication with a defect review system 200 and/or a server 209.

The defect review system 200 includes a stage 204 configured to hold a wafer 203 or other workpiece. The stage 204 may be configured to move or rotate in one, two, or three axes. The defect review system 200 also includes an image generation system 201 configured to generate an image of a surface of the wafer 203. The image may be for a particular layer or region of the wafer 203. In this example, the image generation system 201 produces an electron beam 202 to generate an image 203. Other image generation systems 201 are possible, such as those that use broad band plasma or laser scanning. For example, dark field imaging or bright field imaging can be performed by the image generation system 201. The defect review system 200 and/or image generation system 201 can generate an image of the wafer 203.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

In a particular example, the defect review system 200 is part of or is an SEM. Images of the wafer 203 are generated by scanning the wafer 203 with a focused electron beam 202. The electrons are used to produce signals that contain information about the surface topography and composition of the wafer 203. The electron beam 202 can be scanned in a raster scan pattern, and the position of the electron beam 202 can be combined with the detected signal to produce an image.

The server 209 is configured to store design images for semiconductor wafers or other workpieces.

The defect review system 200 and the server 209 can communicate with the controller 205. For example, the controller 205 can communicate with the image generation system 201 or other components of the defect review system 200. The controller 205 can include a processor 206, an electronic data storage unit 207 in electronic communication with the processor 206, and a communication port 208 in electronic communication with the processor 206. It is to be appreciated that the controller 205 may be implemented in practice by any combination of hardware, software, and firmware. Also, its functions as described herein may be performed by one unit, or divided up among different components, each of which may be implemented in turn by any combination of hardware, software, and firmware. Program code or instructions for the controller 205 to implement the various methods and functions described herein may be stored in controller readable storage media, such as a memory in the electronic data storage unit 207, within the controller 205, external to the controller 205, or combinations thereof.

The controller 205 may be coupled to the components of the defect review system 200 or server 209 in any suitable manner (e.g., via one or more transmission media, which may include "wired" and/or "wireless" transmission media) such that the controller 205 can receive the output generated by the defect review system 200, such as output from the imaging device 201 or output generated by the server 209. The controller 205 may be configured to perform a number of functions using the output. For instance, the controller 205 may be configured to review defects on the wafer 203 using the output. In another example, the controller 205 may be configured to send the output to an electronic data storage unit 207 or another storage medium without performing defect review on the output. The controller 205 may be further configured as described herein, such as to perform the embodiments of FIG. 1 or FIG. 2. The controller 205 also may be configured to send instructions to a review, inspection, or metrology tool for sampling, imaging, inspection, or metrology purposes.

The controller 205, other system(s), or other subsystem(s) described herein may take various forms, including a personal computer system, image computer, mainframe computer system, workstation, network appliance, internet appliance, or other device. In general, the term "controller" may be broadly defined to encompass any device having one or more processors that executes instructions from a memory medium. The subsystem(s) or system(s) may also include any suitable processor known in the art, such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

Program instructions implementing methods such as those described herein may be stored on computer-readable medium, such as in the electronic data storage unit 207 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, Java- Beans, Microsoft Foundation Classes ("MFC"), SSE (Streaming SIMD Extension) or other technologies or methodologies, as desired.

Controller 205 may be configured according to any of the embodiments described herein. For example, the controller 205 may be programmed to perform some or all of the steps of FIG. 1 or 2.

An additional embodiment relates to a non-transitory computer-readable medium storing program instructions executable on a controller for performing a computer-implemented method for identifying abnormalities on a wafer or detecting compliance/non-compliance, as disclosed herein. In particular, as shown in FIG. 5, electronic data storage unit 207 or other storage medium may contain non-transitory computer-readable medium that includes program instructions executable on the controller 205. The computer-implemented method may include any step(s) of any method(s) described herein.

While disclosed as part of a defect review system, the controller 205 described herein may be configured for use with inspection systems. In another embodiment, the controller 205 described herein may be configured for use with a metrology system. Thus, the embodiments as disclosed herein describe some configurations for classification that can be tailored in a number of manners for systems having different imaging capabilities that are more or less suitable for different applications.

Each of the steps of the method may be performed as described further herein. The methods also may include any other step(s) that can be performed by the controller and/or computer subsystem(s) or system(s) described herein. The steps can be performed by one or more computer systems, which may be configured according to any of the embodiments described herein. In addition, the methods described above may be performed by any of the system embodiments described herein.

In another embodiment, the embodiments disclosed herein are executive using a non-transitory computer-readable storage medium. For example, a non-transitory computer-readable storage medium includes one or more programs for executing the following steps. A design file of a die of a wafer is separated into a plurality of regions. A context code is generated for each of the regions. The context code is configured to encode geometry of one of the regions. An image of the die is aligned to the design file at the die. The context code is grouped into one or more inspection sensitivity regions based on a noise level of each of the regions. The dies are scanned using the inspection sensitivity regions. A threshold is calculated for each of the inspection sensitivity regions. The context code is examined for pixels at a detected defect. A criticality of the detected defect is determined based on one or more of the context codes.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
 a review tool, wherein the review tool includes:
  a stage configured to hold a wafer; and
  an image generation system configured to generate an image of the wafer; and
 a controller in electronic communication with the review tool, wherein the controller is configured to:
  separate a design file into a plurality of regions, wherein the design file is of a die of the wafer;
  generate a context code for each of the regions, wherein the context code is configured to encode geometry of one of the regions;
  align an image of the die of the wafer to the design file at the die;
  group the context codes into one or more inspection sensitivity regions based on a noise level of each of the regions;
  scan the die using the inspection sensitivity regions;
  calculate a threshold for each of the inspection sensitivity regions;
  examine the context code for pixels at a detected defect; and
  determine a criticality of the detected defect based on one or more of the context codes.

2. The system of claim 1, wherein the controller includes a processor, an electronic data storage unit in electronic communication with the processor, and a communication port in electronic communication with the processor and the electronic data storage unit.

3. The system of claim 2, wherein the electronic data storage unit includes the design file.

4. The system of claim 1, wherein the review tool is a scanning electron microscope.

5. The system of claim 1, wherein the image generation system is configured to use at least one of an electron beam, a broad band plasma, or a laser to generate the image of the wafer.

6. The system of claim 1, wherein the context code represents one or more of edge density, a vector of feature values, or a set of shape primitives of one of the regions.

7. The system of claim 1, wherein the controller is further configured to analyze noise of the regions prior to grouping the context codes.

8. The system of claim 1, wherein the controller is further configured to bin local geometry to capture at least one of line and space density measurement, line and space orientations, high curvature points, and line ends and object junctions.

9. A method comprising:
 separating, using a controller, a design file into a plurality of regions, wherein the design file is of a die of a wafer;
 generating, using the controller, a context code for each of the regions, wherein the context code is configured to encode geometry of one of the regions;
 aligning, using the controller, an image of the die to the design file at the die;
 grouping, using the controller, the context code into one or more inspection sensitivity regions based on a noise level of each of the regions;
 scanning the die using the inspection sensitivity regions;
 calculating, using the controller, a threshold for each of the inspection sensitivity regions;
 examining, using the controller, the context code for pixels at a detected defect; and
 determining, using the controller, a criticality of the detected defect based on one or more of the context codes.

10. The method of claim 9, wherein the context code represents one or more of edge density, a vector of feature values, or a set of shape primitives of one of the regions.

11. The method of claim 9, further comprising analyzing, using the processor, noise of the regions prior to the grouping.

12. The method of claim 9, wherein the image of the die is a scanning electron microscope image.

13. The method of claim 9, wherein the design file includes a plurality of layers disposed on one another.

14. The method of claim 9, wherein the context code is configured to be a measure of edge density or a vector of feature values computed from the design file.

15. The method of claim 9, wherein the context code is configured to be an encoding of a set of shape primitives in the region.

16. The method of claim 15, wherein the encoding is frequency based and is configured to count existence of shape primitives in the region.

17. The method of claim 15, wherein the encoding is of a spatial relationship between the shape primitives.

18. The method of claim 9, further comprising binning local geometry, wherein the binning captures at least one of line and space density measurement, line and space orientations, high curvature points, and line ends and object junctions.

19. The method of claim 9, wherein the design file is generated from a wafer image.

20. A non-transitory computer-readable storage medium, comprising one or more programs for executing the following steps on one or more computing devices:
   separating a design file of a die of a wafer into a plurality of regions;
   generating a context code for each of the regions, wherein the context code is configured to encode geometry of one of the regions;
   aligning an image of the die to the design file at the die;
   grouping the context code into one or more inspection sensitivity regions based on a noise level of each of the regions;
   scanning the die using the inspection sensitivity regions;
   calculating a threshold for each of the inspection sensitivity regions;
   examining the context code for pixels at a detected defect; and
   determining a criticality of the detected defect based on one or more of the context codes.

* * * * *